United States Patent
Creamer et al.

(10) Patent No.: US 7,509,412 B2
(45) Date of Patent: *Mar. 24, 2009

(54) GHOST AGENTS FOR APPLICATION DOMAINS WITHIN A GRID ENVIRONMENT

(75) Inventors: Thomas E. Creamer, Boca Raton, FL (US); Bill H. Hilf, La Habra, CA (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 861 days.

This patent is subject to a terminal disclaimer.

(21) Appl. No.: 10/666,309

(22) Filed: Sep. 19, 2003

(65) Prior Publication Data

US 2005/0066025 A1    Mar. 24, 2005

(51) Int. Cl.
*G06F 15/173* (2006.01)
*G06F 11/00* (2006.01)

(52) U.S. Cl. ......................................... 709/224; 714/38
(58) Field of Classification Search .................. 709/224; 714/38; 705/1
See application file for complete search history.

(56) References Cited

U.S. PATENT DOCUMENTS

| | | | |
|---|---|---|---|
| 5,592,609 A | 1/1997 | Suzuki et al. | |
| 5,935,006 A | 8/1999 | Nakajima | |
| 6,024,643 A | 2/2000 | Begis | |
| 6,419,577 B1 | 7/2002 | Okada et al. | |
| 7,337,363 B2* | 2/2008 | Creamer et al. | 714/38 |
| 2002/0002074 A1 | 1/2002 | White et al. | |
| 2002/0095596 A1* | 7/2002 | Williams | 713/200 |
| 2002/0112048 A1* | 8/2002 | Gruyer et al. | 709/224 |

OTHER PUBLICATIONS

U.S. Appl. No. 10/665,582, filed Sep. 19, 2003, Creamer et al.
U.S. Appl. No. 10/665,585, filed Sep. 19, 2003, Creamer et al.
U.S. Appl. No. 10/666,307, filed Sep. 19, 2003, Creamer et al.

* cited by examiner

*Primary Examiner*—Joseph E Avellino
*Assistant Examiner*—Jeong S Park
(74) *Attorney, Agent, or Firm*—Akerman Senterfitt

(57) ABSTRACT

A method for evaluating system behavior of an application domain within a grid environment can include the step of identifying a host software object within the application domain. A software object can be associated with the host software object. Within the associated software object, host actions can be replicated. Replicated actions can be recorded. The host software object can move from one grid within the grid environment to a different grid. The associated software object can responsively move within the grid environment in accordance with movement of the host software object.

8 Claims, 5 Drawing Sheets

GHOST AGENTS FOR APPLICATION DOMAINS WITHIN A GRID ENVIRONMENT

BACKGROUND OF THE INVENTION

1. Technical Field

The present invention relates to the field of computer software and, more particularly, to application-specific process tracking and recordation within a grid environment.

2. Description of the Related Art

An application domain can be defined as an application that spans multiple grids of a grid computing environment. That is, an application domain can include a set of related tasks, which can be utilized by users of the application domain. The computing resources used by the application domain for performing its tasks can be provided by different grids in a grid computing environment. Accordingly, an application domain can be a grid-based "virtual application. Application domains can include, for example, word processors, database programs, Web browsers, development tools, drawing applications, image editing programs, communication programs, and the like.

As used herein, a grid computing environment can be a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

One problem with existing grid computing environments relates to the logging or recordation of events or actions. More specifically, within a grid environment, computer processes, applications, and users can utilize computing resources from many different hardware sources disposed across several computing grids. Therefore, no common location exists for logging system information. Without accurate system logs, system designers and administrators cannot determine which computing resources are consumed by individual computer processes, application domains, and users. Accordingly, in a grid computing environment, equitably allocating grid computing resources among a set of consumers, troubleshooting computing grids, and efficiently upgrading computing grids can be exceptionally difficult.

As conventionally implemented, grid environments do not generate application-specific usage records. More specifically, conventional data recordation methods typically attempt to establish standardized log files in a standardized format used by every grid component. The various standardized logs can be interrogated by an application domain. Then the application domain can then construct an application-specific activity record by piecing together the appropriate standardized log entries.

Appreciably, it is difficult to establish a mutually agreeable log standard to be used across diverse grid components in a grid environment. One hurdle in forming such a standard is that different application domains can require data recordation at different levels of granularity. Further, it can be highly inefficient to overly record all computing actions performed by a grid component when records are only needed for a limited number of application-specific computing actions. Another hurdle is that constructing application-specific usage records from several standardized logs can consume significant resources and time when an application domain spans a multitude of distributed grid components.

SUMMARY OF THE INVENTION

The invention disclosed herein provides a method, a system, and an apparatus for establishing and utilizing ghost agents for application domains within a grid environment. More specifically, the present invention can utilize ghost agents to record actions performed within an application domain spanning multiple grids of a grid computing environment. A ghost agent can be a software object associated with a host software object that records actions taken by the host software object. A host software object can include application users, application features, application resources, and application processes. An associated ghost agent is able to follow its host software object from grid to grid in a grid computing environment and is able to record the actions performed by the host software agent. The recorded actions can be conveyed to a ghost log repository established for a specified application domain. This ghost log repository can be used to model the behavior of the application domain.

One aspect of the present invention includes a method for evaluating system behavior of an application domain within a grid environment. The method can identify a host software object within the application domain. A software object can be associated with the host software object and host actions can be replicated within the associated software object. In one arrangement, the associated software object can be referred to as a ghost agent. The replicated actions can be passive actions that are prevented from executing in the grid environment. The associated software object can also record the replicated actions. For example, a location for logging data can be determined and the recorded replicated actions can be conveyed to the determined location. The determined location can be external to the associated software object. The host software object can be moved from one grid within the grid environment to another grid. The associated software object can responsively move within the grid environment in accordance with the movement of the host software object. Multiple host software objects can be selected within the application domain, wherein each host software object can be associated with a software object that replicates and records the actions of the associated host software object.

In one embodiment, usage statistics for the application domain can be determined based at least in part upon the recorded actions. For example, usage statistics for application domain features of the application domain can be determined. The usage statistics can also be used to optimize performance of the application domain.

In another embodiment, the associated software object can be disassociated from the host software object and re-associated with a different host software object within the application domain. Additionally, the associated software object can be cloned to create a copied object. The copied object can be associated with a different host software object within the application domain.

Another aspect of the present invention can include a system for logging application domain information within a grid environment. The system can include an application domain that utilizes computing resources from one or more grids of the grid environment. The system can also include at least one host software object and at least one ghost agent. Each host software object can be configured to execute actions within the application domain, wherein different ones of the executed actions can be executed within different grids of the grid environment. Each ghost agent can be configured to record the executed actions for an associated host software object.

In one embodiment, a plurality of host software objects and ghost agents can exist. An application domain data store can be provided, which is configured to receive messages from the ghost agents. An application analyzer can also be provide, which is configured to analyze application-specific data gathered by the ghost agents.

Another aspect of the present invention can include a machine-readable storage medium being programmed to cause a machine to perform the various steps disclosed herein.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for establishing and utilizing ghost agents for application domains within a grid environment. A ghost agent is a software object that can be associated with a host software object, such as an application user, an application feature, an application resource, and/or an application process. The ghost agent can replicate the actions of the host software object and follow the host software object whenever the host software object moves from grid to grid. The replicated actions can be recorded, thereby establishing a log for the activities of the host software object. The logs for individual ghost agents can be conveyed to a centralized application-specific ghost log repository and used to characterize the usage of computing resources within the application domain.

Figure 1:
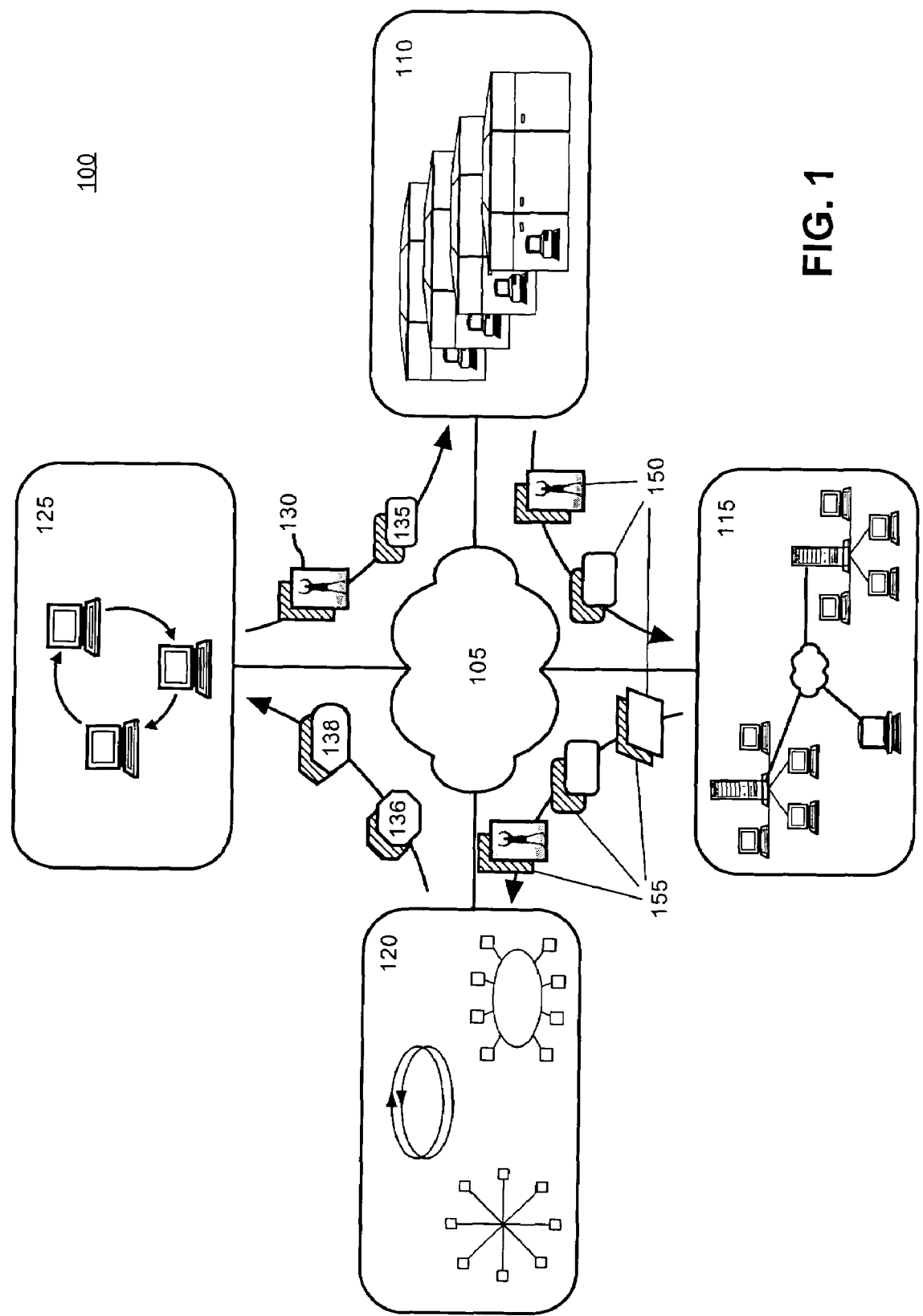
FIG. 1 is a schematic diagram illustrating an exemplary grid environment enabled for ghost agents and host processes in accordance with the inventive arrangements disclosed herein.

FIG. 1 is a schematic diagram illustrating an exemplary grid environment 100 enabled for ghost agents and host processes. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

The grid environment 100 infrastructure can include components that utilize any hardware platform, operating system, storage scheme, and software resource. In order to be integrated within the grid environment 100, each computing component can be communicatively linked to the grid environment 100. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources. Users, applications, and processes utilizing the grid environment 100 can utilize computing resources produced by hardware residing within one or more grids.

The network 105 can communicatively link the various computing components that form the grid environment 100. The network 105 can utilize any communication medium to facilitate information exchange within the grid environment including, but not limited to, wireless pathways, line-based pathways, satellite pathways, and line-of site pathways. Moreover, the network 105 can include global networks, local networks, and stand-alone computing devices. For example, the network 105 can include the Internet, intranets, and other sub-networks. Additionally, the network 105 can include mainframes, personal computers, personal data assistants, cellular telephones, landline telephones, networked peripherals, and other hardware. The network 105 can also include circuit and/or packet switched network equipment.

The grid 110 can include a multitude of mainframe or supercomputers. Grids designed primarily for computing power, often called computational grids, typically contain one or more supercomputers. The grid 115 can include several local area networks, workgroups, and computing arrays. Grids including resources from dispersed local area networks are often referred to as scattered grids.

The grid 120 is yet another exemplary grid that can include computing resources arranged according to any topography including, but not limited to, star topographies, Fiber Distributed Data Interface (FDDI) rings, token rings, and the like. Organized and redundant topographies are often used to store essential data in a redundant fashion so that single points of failure do not result in system outages. Grids designed primarily for data storage and retrieval are often called data grids.

The grid 125 is still another exemplary grid that can include one or more peer-to-peer networks. The peer-to-peer networks can be secured and/or unsecured networks. It should be noted that any type of grid can be included in the grid environment and that grids 110, 115, 120, and 125 are merely illustrative examples of possible grids. One of ordinary skill in the art can appreciate that the invention is not to be limited in this regard, that any hardware resources, topography, and software can be included in the grid environment 100, and that such arrangements are contemplated herein.

Software objects called host software objects 150 can traverse the various grids 110, 115, 120, and 125 of the grid environment and execute actions therein. Host software objects 150 can include such objects as user objects 130, applications 135, application features 136, and application resources 138. Each type of host software object 150 can move from grid to grid within the grid environment 100.

Each user object 130 can represent an identity of an entity logged into the grid environment 100 including, but not limited to, users, categories of users, companies, organizations, and virtual organizations. The user object 130 can execute actions responsive to requests. For example, the user object 130 can convey user requests to suitable components within the grid environment 100, receive request responses, and provide the request responses to the user.

Each application 135 can represent a software unit configured to perform a group of related actions. In one arrangement, the application 135 can be functionally directed towards a particular set of tasks. For example, the application 135 can be a word processing application configured to perform tasks relating to textual electronic documents such as editing, storing, searching, proofreading, translating, transcribing, formatting, and the like. In a different functional example, the application 135 can be an interactive voice response (IVR) application configured to automatically provide customer related services.

In another arrangement, the application 135 can include a set of structurally related software objects and corresponding methods. For example, the application 135 can represent a region or realm within a Massive Multi-Player Gaming (MMPG) system. In a different structural example, the application 135 can represent the set of components that form a virtual machine executing within the grid environment 100.

Each application feature 136 can represent a software unit configured to perform a subset of tasks. For example, a word processing application can include table features, drawing features, graphic editing features, printing features, and the like. In another example, a MMPG can include guild features, combat features, interactive chat features, character customization features, dial-up specific connectivity features, character background features, language translation features, speech recognition features, and the like.

Each application resource 138 can represent a software unit configured to monitor a specified resource. A monitored resource can be either a hardware or a software resource. A software resource can include the utilization of a software module, library, or routine. For example, a software resource can include, but is not limited to, a data search routine, a Dynamic Link Library (DLL), and an object linking and embedding (OLE) object. A software resource can also include an instance of an application when only a predefined number of application instances can be simultaneously utilized. For example, many office applications, such as word processors and databases shared across a network, can have a limited number of licensed instances that can be utilized at any period. A hardware resource, on the other hand, can include any hardware resource that can be monitored such as CPU cycles utilized, storage space consumed, pages printed, faxes sent, email conveyed, and the like.

Each host software object 150 can have an associated ghost agent 155. The ghost agent 155 can replicate the actions of the host software object 150 and follow the host software object 150 from grid to grid. The actions replicated within the ghost agent 155 can be recorded or logged. In one embodiment, the replicated actions within the ghost agents can be passive actions that are prevented from executing within the grid environment 100. In an alternate embodiment, the ghost agents 155 can generate active actions that are operationally executed within the grid environment 100.

It should be noted that if a statistically relevant number of ghost agents 155 are included within the grid environment 100, the behavior of the grid environment 100 can be modeled. For example, if one fifth of the users of the grid environment 100 are a statistically relevant quantity for modeling purposes, then grid environment 100 can be modeled by associating a ghost agent 155 to one out of every five user objects 130.

One illustrative example of ghost agents 155 operating within a grid environment 100 can relate to a MMPG system. Each player of the MMPG system can be represented by a user object 130 that responds to user instructions and interacts with the gaming environment. While playing the MMPG, players can move from one game play area to another, thereby moving from one grid to another within the grid environment 100. Ghost agents 155 can be attached to selected players. For example, a MMPG developer implementing a new guild or organization that players can join can attach ghost agents 155 to a portion of players belonging to the guild so that guild related behavior can be examined. The ghost agents 155 can record the actions of associated players regardless of which grid a player utilizes. The recorded actions of the monitored players can be conveyed by the ghost agents 155 to a centralized network location configured to log player activities.

Similarly, a ghost agent 155 can record actions relating to a particular object within the MMPG system, such as a weapon. The selected object can function within the grid environment 100 as the host software object 150. For example, the ghost agent 155 can be associated directly with the selected weapon, wherein the selected weapon is the host software object 150.

In another example, the actions relating to the selected object of the MMPG system can be monitored using one or more ghost agents 155 that are not directly associated with the monitored object. For instance, the ghost agent 155 can be associated with whatever player currently possesses the selected weapon and can record only weapon specific actions. If the weapon is conveyed from one player to another, the ghost agent 155 can automatically disassociate itself with the first player and re-associate itself with the player now possessing the weapon. The ghost agent can convey the recorded actions relating to the weapon to a centralized location configured to log actions pertaining to game items. Of course, the above MMPG example is just one possible application within which ghost agents 155 can be utilized and the invention is not limited in this regard.

Figure 2:
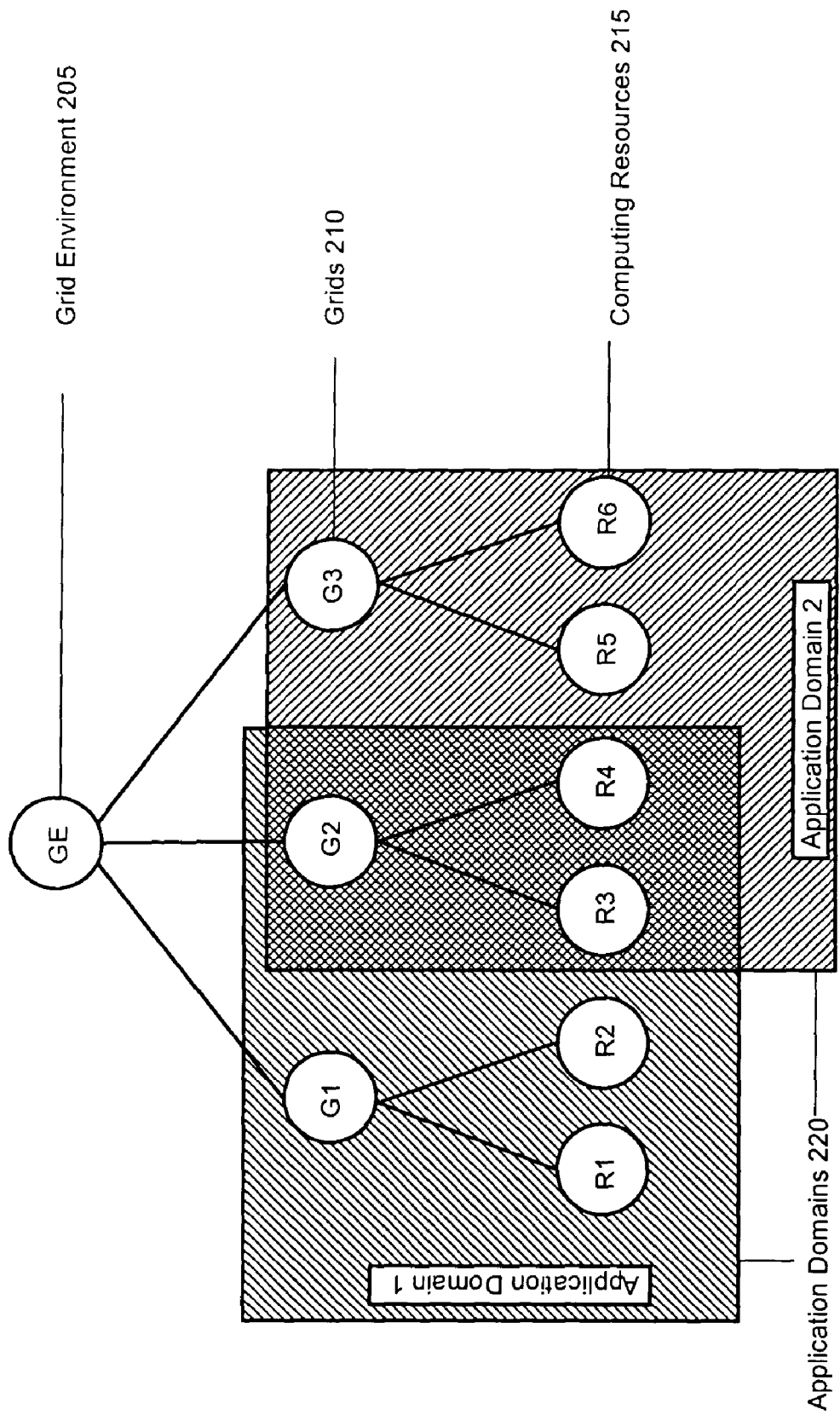
FIG. 2 is a schematic diagram illustrating the relationship between exemplary application domains and a grid environment in accordance with the inventive arrangements disclosed herein.

FIG. 2 is a schematic diagram illustrating the relationship between exemplary application domains 220 and a grid environment 205 using the system of FIG. 1. In FIG. 2, the grid environment 205 can be represented by node GE and can included one or more grids 210, which can be represented by nodes G1, G2, and G3. The grid environment 205 and the grids 210 have been previously defined herein. Each grid 210 can provide one or more computing resources 215, which can be represented by nodes R1, R2, R3, R4, R5, and R6. Application domains 220, which can be represented in FIG. 2 by application domain 1 and application domain 2, can span one or more grids 210 utilizing computing resources 215 to perform application-specific functions.

The computing resources 215 can be pooled into the resource pool of the grid environment 205 and be utilized by various grid users on demand. Computing resources 215 can include low-level and high-level resources as well as software and hardware resources. Low-level resources can include processing cycles of a CPU, storage space in a memory, capacity, or bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The application domains 220 can function as a "virtual applications" disposed within the grid environment 205 that are accessible by users communicatively linked to the grid environment 205. Unlike traditional applications that reside on one server, each of the application domains can physically span across several geographically disperse hardware resources yet logically function as a single set of user accessible tasks. Exemplary application domains 220 can include productivity applications, entertainment applications, development applications, office applications, utility applications, multimedia applications, data management applications, graphic design applications, and the like.

Figure 3:
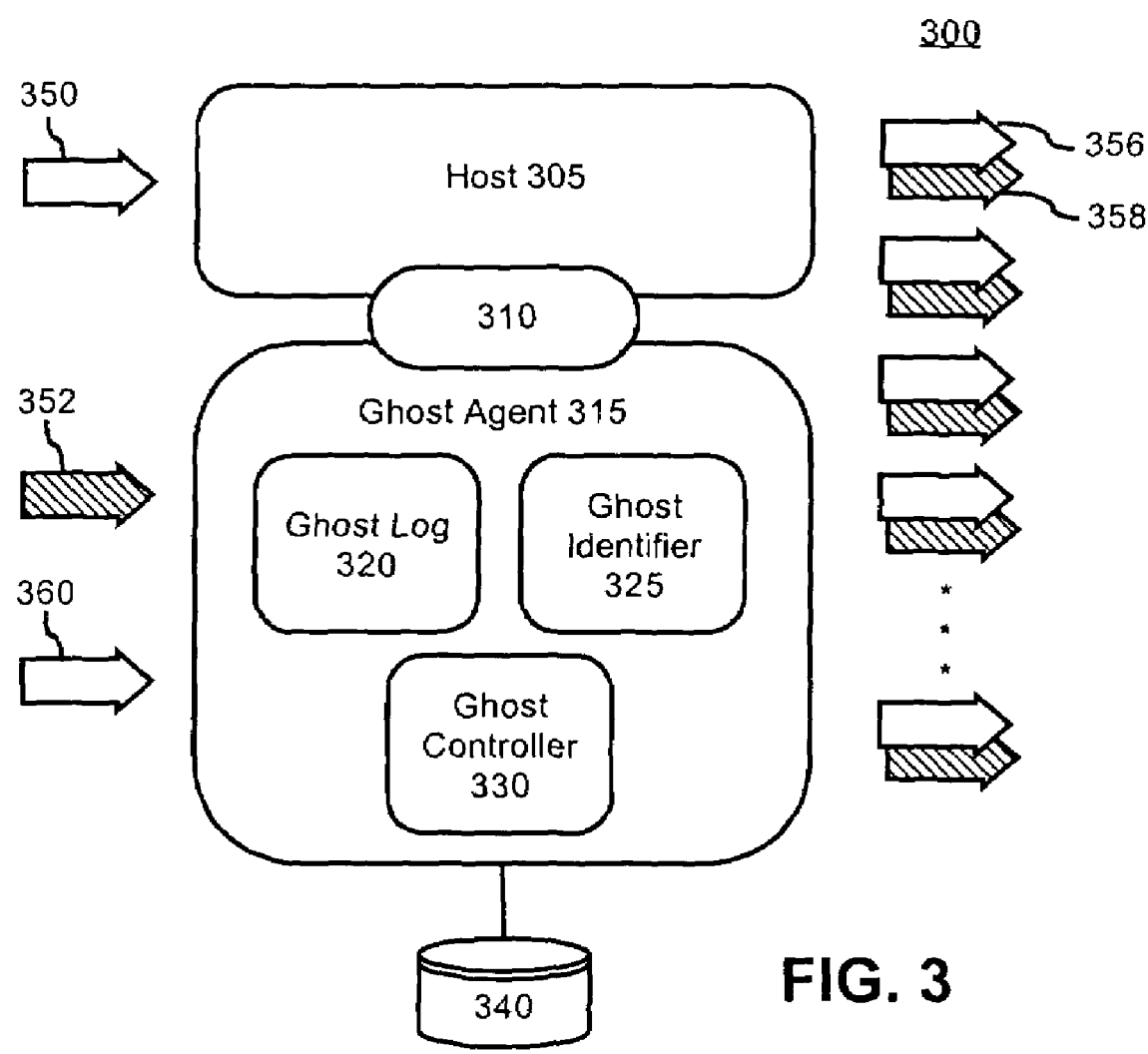
FIG. 3 is a schematic diagram detailing a host software object and a ghost agent within a grid environment in accordance with the inventive arrangements disclosed herein.

FIG. 3 is a schematic diagram detailing a host software object 305 and a ghost agent 315 within a grid environment 300 in accordance with the inventive arrangements described herein. The host software object 305 can be any definable software unit within the grid environment 300 that can receive input 350 and execute actions 356. For example, the host software object 305 can include, but is not limited to, a user object, an application, and a process.

The ghost agent 315 can be a passive or active software object that can be associated with a host software object 305 and replicate message flows received from and performed by the host software object 305. The ghost agent 315 can copy the host input 350 received by the host software object 305, thereby creating ghost input 352. The ghost agent 315 can also replicate the host actions 356 performed by the host software object 305, wherein the replicated actions can be referred to as ghost actions 358. The operation of the host software object 305 is generally not appreciably affected by the existence of the ghost agent 315. Consequently, the relationship between the host software object 305 and the ghost agent 315 can often be considered a passive one.

The ghost agent 315 can include a ghost log 320, a ghost identifier 325, and a ghost controller 330. The ghost log 320 can record the ghost input 352 and ghost actions 358, thereby creating a log. The ghost log 320 can be configured to record all activities relating to the associated host software object 305 or can be configured to record only selected activities. For example, in one embodiment, the ghost log 320 can record only activities considered errors, thereby generating an error log. In another example, the ghost log 320 can record a statistically relevant portion of actions, such as recording every fifth ghost input 352 and corresponding ghost actions 358. The ghost log 320 can also capture system information and add annotations from this system information to the generated log.

For example, system clock information can be captured and used to annotate the time between receiving a ghost input 352 and generating ghost actions 358. In another example, metadata information contained within message flows, such as host input 350, ghost input 352, host action 356, and ghost action 358, can be utilized by the ghost log 320. Additionally, the ghost log 320 can time stamp actions recorded within the ghost agent 315.

The ghost log 320 can also record the log information in a ghost log repository 340. The ghost log repository 340 can be a temporary buffer or a persistent data storage area. If the ghost log repository 340 is external to the ghost agent 315, any of a variety of different mechanisms can be utilized to convey the log data to the ghost log repository 340.

For example, an intermittent communication link, such as a unicast or a point-to-point communication link can be established between the ghost log 320 and the ghost log repository 340 through which data can be conveyed. In another example, a buffer space within the ghost agent 315 can record log information. Whenever the buffer reaches a specified volume of data, a message containing the buffered information can be conveyed to the ghost log repository 340 and the buffer within the ghost agent 315 can be cleared and used to store fresh data.

In yet another example, ghost agents 315 can convey log data to a local data server. The local data server can then convey all received log data to the ghost log repository 340 from time to time or on a periodic basis. In still another example, the ghost agent 315 can intermittently deposit log data to a local location. Then a data-reaping object can gather packets of the log data that have been locally deposited by the various ghost agents 315. The packets of log data can be conveyed to the ghost log repository 340 by the data-reaping objects.

While ghost log repository 340 is depicted as being external and possibly remotely located from the ghost agent 315, it should be appreciated that the ghost log repository 340 can also be an allocated memory space internal to the ghost agent 315. For example, the ghost log repository 340 can be a dynamically allocated segment of random access memory (RAM) available to the ghost agent 315 as needed.

The ghost identifier 325 can provide identification, authorization, and security related functions for the ghost agent 315. That is, the ghost identifier 325 can identify the ghost agent 315 to the various components of the grid environment 300. Accordingly, servers in the grid environment 300 can have an awareness of the ghost agent 315. The grid servers can then use policy-based controls to manage permissions, authentication, resource utilization, and security for the ghost agents 315. Ghost agents 315 adhering to the established policies can be permitted to automatically enter and exit the various grids of the grid environment 300.

The ghost agent 315 can be granted different access privileges to computing resources as the ghost agent 315 traverses from one grid in a grid environment 300 to another depending on grid-based policies. Privileges afforded the ghost agent 315 can be determined any manner known in the art. For example, a ghost agent 315 can replicate the passwords provided by the host software object 305 and use the replicated passwords to provide authentication to the grid environment 300. In another example, before a ghost agent 315 can be permitted to follow an associated host software object 305 from one grid in the grid environment 300 to the next, a password or digital certificate unique to the ghost agent 315 can be required. The ghost agent 315 can receive the same system privilege level with the grid environment 300 as the host software object 305 or can receive a different privilege level.

The ghost controller 330 can manage the ghost agent 315. For example, the ghost controller 330 can establish a life span for a particular ghost agent 315 so that the ghost agent 315 self-terminates after a designated period. In another example, the ghost controller 330 can restrict the computing resources consumed by the ghost agent 315, thereby freeing up system resources in the grid environment 300 for improved operational performance. Alternately, the ghost controller 330 can increase the computing resources consumed by the ghost agent 315, thereby slowing down operational performance in the grid environment 300. Slowing performance can be beneficial when simulating a load during testing.

In one embodiment, the ghost controller 330 can accept control signals 360 from an external source. For example, the ghost controller 330 can receive control signals 360 causing the ghost agent 315 to alter previously designated behavior. Further, the ghost controller 330 can include a listener object capable of responding to particular events broadcasted by a corresponding notifier object. For example, a server could broadcast a signal causing all ghost controllers 330 to limit the resource consumption of all ghost agents 315 presently disposed in the server. Similarly, a grid wide broadcast could cause specified ghost agents 315 to self-terminate.

In one embodiment, the ghost actions 358 can be transmitted into the grid environment 300 by the ghost controller 330 to be executed. For example, the ghost action 358 can be directed to a test environment, as opposed to an operational environment, in order to prevent duplicative actions from being operationally performed. Ghost actions 358 can be also be directly executed within an operational environment. When duplicative actions are operationally undesirable, the results of executed ghost actions 358 can be rolled back.

In another embodiment, the ghost actions 358 can be logged internally yet not be transmitted to system components external to the ghost agent 315. For example, when the ghost agent 315 is a passive software object, the ghost actions 358 need not be transmitted for execution.

A ghost interface 310 can be used to associate or bind the ghost agent 315 with the host software object 305 using any suitable technique. For example, techniques used by software debugging programs to attach monitors to running programs in order to evaluate system behavior and step through code can be used to bind the ghost agent 315 with the host software object 305. Additionally, techniques used by system calibration and hardware performance testing utilities can be used by the ghost interface 310 to bind the ghost agent 315 with the host software object 305. Further, operating system level commands, tools, and functions analogous or similar to the UNIX commands "strace" and "ttrace," can be used by the ghost interface 310 to bind the host software object 305 with the ghost agent 315.

Figure 4:
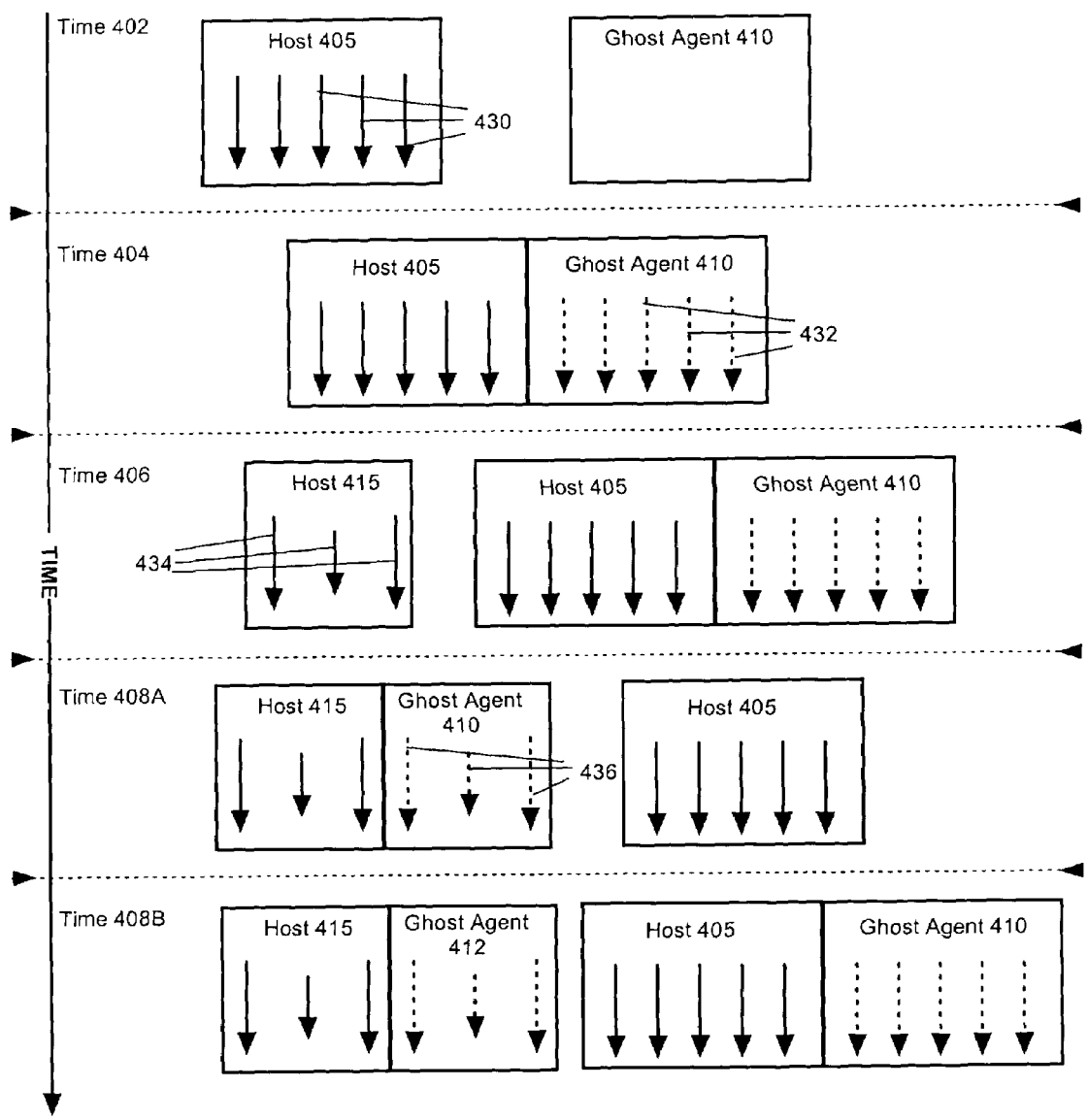
FIG. 4 is a schematic diagram illustrating the interaction between hosts and ghost agents over time in accordance with inventive arrangements disclosed herein.

FIG. 4 is a schematic diagram illustrating the interaction between hosts and ghost agents over time in accordance with the inventive arrangements disclosed herein. The interaction can begin at time 402 with an unassociated ghost agent 410 and a host software object 405 executing host actions 430. At time 404, the ghost agent 410 can associate itself with the host software object 405. During this association process, each host action 430 within the host software object 405 can be replicated within the ghost agent 410 as a ghost action 432. Further, anytime a new action is initiated within the host software agent 410, the new action can be replicated within the associated ghost agent 410.

Each ghost action 432 can be either a passive or an active action. For example, the host actions 430 can be executed within the grid environment while the ghost actions 432 can be passive actions that are operationally disabled. Passive actions are those actions that do not affect the operational behavior of the host software agent 405. Passive actions are also not executed or acted upon by an operational portion of the grid environment. Accordingly, passive actions can be utilized primarily for logging and/or testing purposes.

In another arrangement, the ghost actions 432 can be active actions affecting the operational performance of the environment and/or the associated host software agent 405. For instance, a ghost action 432 can consume limited computing resources thereby inducing a delay into the system and potentially slowing down system response time for the corresponding host software object 405. Delays induced by ghost actions 432 can be tailored by changing the execution details of the instruction set described within individual ghost actions 432.

For example, if a host action 430 invokes a portion of code such as an interactive process that cycles fifty times, the originally copied ghost action 432 can also cycle fifty times. The ghost agent 410 can increase the number of cycles in the iterative process to some number greater than fifty to slow down processing time and can decrease the cycles to a number less than fifty to speed up processing time.

At time 406, an interaction between host software object 405 and host software object 415 executing actions 434 can occur. This interaction can trigger either a transfer of the ghost agent 410 or a cloning of the ghost agent 410, wherein time 408A illustrates the results of an exemplary transfer action and time 408B illustrates the results of an exemplary cloning action.

At time 408A, the ghost agent 410 can be transferred from host software object 405 to host software object 415. For example, the ghost agent 410 can be first disassociated with host software object 405. The disassociation causes the ghost agent 410 to stop replicating actions of the host 405. Then the ghost agent 410 can be associated with host software object 415. During the association, the actions 434 can be replicated within ghost agent 410 resulting in ghost actions 436. Accordingly, the actions now recorded by the ghost agent 410 and placed within a ghost log repository are based upon host software object 415 and are not based upon host software object 405. In another example, the ghost agent 410 can be replicated and attached to the host software agent 415. Once replicated, the original ghost agent 410 associated with the host software object 405 can be deleted.

At time 408B, the ghost agent 410 can be cloned resulting in the creation of ghost agent 412, which is a copy of ghost agent 410. Ghost agent 412 is then associated with host 415. During the association, the actions 434 can be replicated within ghost agent 412. Accordingly, the actions for both host software object 405 and host software object 415 can be recorded by respective ghost agents 410 and 412 and thereafter placed in the ghost log repository for logging purposes.

It should be noted that ghost agents 410 and 412 can be self-managing, self-identifying software objects capable of performing predefined tasks in a self-sufficient manner. For example, the ghost agents 410 and 412 can be programmed to seek a host software object of a specified type, to track a desired host software object from one grid location to another within a grid environment, to move from one grid in a grid environment to another, and/or to associate with host software objects. In another example, the ghost agents 410 and 412 can be programmed to clone and attach themselves whenever a predetermined condition occurs, such as whenever a user object of a particular type is encountered.

Figure 5:
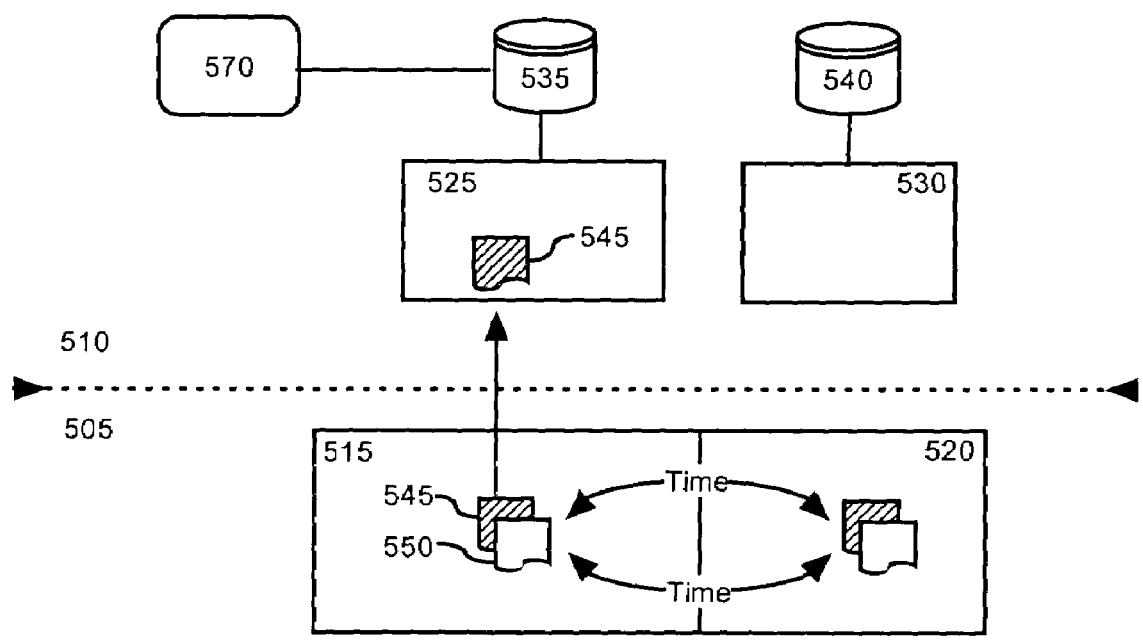
FIG. 5 is a schematic diagram illustrating the interaction of ghost agents with components of a grid environment and an application domain in accordance with inventive arrangements disclosed herein.

FIG. 5 is a schematic diagram illustrating the interaction of ghost agents with components of a grid environment 505 and an application domain environment 510 in accordance with inventive arrangements disclosed herein. Within the grid environment 505, a host software object 550 and an associated ghost agent 545 can move from grid 515 to grid 520 and back over time. That is, the various grids of the grid environment 505 contain different computing resources that the host software object 550 can utilize. The ghost agent 545 can record the actions taken by the host software object 550 regardless of the grid in which the action was executed.

Movement of the host software object 550 and the ghost agent 545 from grid 515 to grid 520 can occur in many different ways. For example, movement can signify the conveyance of a self-managing software object from grid 515 to grid 520, which can include the software object providing identification information to grid 520 and the software object receiving authorization to enter grid 520.

In another example, the movement can actually involve duplicating in grid 520 at least an operational portion of a software object of grid 515. In such an example, the data recorded in grid 515 by the ghost agent 545 can be duplicated either when the ghost agent 545 is created in grid 520 or can be excluded from the duplicated ghost agent 545. If the duplicated ghost agent 545 does not contain the previously recorded data, this data can be conveyed to a data storage area before the original ghost agent 545 of grid 515 is terminated.

The various ghost agents can be associated with particular application domains of the application domain environment 510. For example, the ghost agent 545 can be used to record data for application domain 525. From time to time, the recorded data can be conveyed from a ghost agent to an application domain data store 535. Different ghost agents within the grid environment 505 can be associated with other application domains, such as application domain 530 that records data in application domain data store 540.

A data analyzer 570 can examine the data stored within the application domain data store 535 for patterns. The data analyzer 570 can utilize a variety of different analysis techniques known in the art for a variety of different purposes. For example, the data analyzer 570 can determine the features of the application domain 525 that are used the most so that developers can focus on the most utilized features when providing additional enhancements to the application domain 525. Similarly, the data analyzer 570 can determine the features of the application domain 525 that are used the least so that developers can shift their attention away from maintaining and enhancing the segments of the application domain 525 that are seldom utilized. In another example, the data analyzer 570 can determine traffic or usage patters among various computing resources within the application domain 525. The traffic patterns can be used to optimize the performance of the application domain or increase the efficiency with which the application domain 525 utilizes resources. The data analyzer 570 can also determine if patterns exist between groupings of users and application features in order to target application domains for specific groups of users.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for evaluating system behavior of an application domain within a grid environment comprising the steps of:
   identifying a host software object operating within a computing resource of said application domain, said computing resource within one grid of said grid environment;
   associating a ghost software object located within said one grid to said host software object, wherein said associated ghost software object replicates actions of said host software executed within said one grid, and wherein said associated ghost software object records said replicated actions;
   transferring said host software object from said computing resource in said one grid within said grid environment to another computing resource, said another resource within another grid within said grid environment; and,
   responsive to transferring said host object to said another grid, transferring said associated ghost software object from said one grid to said another grid, wherein said associated ghost software object replicates said host software actions within said another grid, and wherein said associated ghost software object records said replicated actions in said another grid.

2. The method of claim 1, further comprising the step of:
   determining usage statistics for said application domain based at least in part upon said recorded actions.

3. The method of claim 2, further comprising the step of:
   optimizing performance of said application domain based upon said usage statistics.

4. The method of claim 1, wherein said replicated actions are passive actions, said method further comprising the step of:
   preventing said replicated actions from operationally executing in said grid environment.

5. The method of claim 1, further comprising the steps of:
   determining a location for logging data that is external to said associated ghost software object; and,
   conveying said recorded replicated actions to said determined location.

6. The method of claim 1, further comprising the steps of:
   disassociating said associated ghost software object from said host software object; and,
   re-associating said ghost software object to a different host software object within a same one of said grids as said disassociated ghost software object.

7. The method of claim 1, further comprising the steps of:
   cloning said associated ghost software object to create a cloned ghost object; and,
   associating said cloned ghost object to a different host software object within a same one of said grids as said cloned ghost object.

8. The method of claim 1, further comprising the steps of:
   selecting a plurality of host software objects within said application domain; and,
   for each said selected host software object, repeating said associating step, said replicating step, said recording step, and transferring steps.

* * * * *